United States Patent [19]
Rook et al.

[11] Patent Number: 4,856,976
[45] Date of Patent: Aug. 15, 1989

[54] DEVICE FOR MANUFACTURING STONES

[75] Inventors: Cornelis Rook, Krimpen; Willem Klein, Laren, both of Netherlands

[73] Assignee: Gebroeders Rook Beheer B.V., Ijssel, Netherlands

[21] Appl. No.: 187,841

[22] Filed: Apr. 29, 1988

[30] Foreign Application Priority Data

May 8, 1987 [NL] Netherlands ........................ 8701096

[51] Int. Cl.[4] ............................................. B29C 43/42

[52] U.S. Cl. .................................... 425/320; 425/411; 425/413; 425/414

[58] Field of Search ............... 425/409, 411, 412, 413, 425/414, 452, 468, 330

[56] References Cited

U.S. PATENT DOCUMENTS

| | | | |
|---|---|---|---|
| 2,475,435 | 7/1949 | Rasmussen | 425/DIG. 58 |
| 2,624,928 | 1/1953 | Long | 425/468 |
| 3,679,340 | 7/1972 | Springs | 425/457 |
| 4,427,355 | 1/1984 | Vatterott | 425/468 |

FOREIGN PATENT DOCUMENTS 214684 3/1987 European Pat. Off. .

*Primary Examiner*—Jay H. Woo
*Assistant Examiner*—Timothy W. Heitbrink
*Attorney, Agent, or Firm*—Oblon, Spivak, McClelland, Maier & Neustadt

[57] ABSTRACT

Device for manufacturing stones, provided with a frame, with a mould having boundary walls defining moulding rooms inside the mould, with a stamp movable up-and-down arranged above the mould and with a table arranged under the mould. Filling pieces are movable between a first position, in which they are located under the mould and whereby, see in top view, at least parts of the filling pieces project from the walls for forming recesses, and a second position, in which the filling pieces are located beside the mould, seen in top view. Extensions are connected to the filling pieces, those extensions being movable forward and backward and co-operating with guide means for guiding the filling pieces, whereby the extensions project from the mould in the first position.

16 Claims, 4 Drawing Sheets

DEVICE FOR MANUFACTURING STONES

FIELD OF THE INVENTION

The invention relates to a device for manufacturing stones, provided with a frame, with a mould having boundary walls defining moulding rooms inside the mould, with a stamp movable up-and-down arranged above the mould and with a table arranged under the mould, as well as with filling pieces which are movable between a first position, in which they are located under the mould and whereby, seen in top view, at least parts of the filling pieces project from the walls for forming recesses, and a second position, in which the filling pieces are located beside the mould, seen in top view.

BACKGROUND OF THE INVENTION

Such a device is known from the European patent application No. 0,214,684. As is i.a. described in the patent application, it is possible, using such filling pieces, to form bevelled edges or so-called chamfers in stones manufactured in an upright position in the mould by keeping the filling pieces in the first position during compression of the mass forming the stones, whilst after forming the stones and before pressing the stones out of the mould the filling pieces are put in the second position, so that subsequently the stones can be pressed out of the mould by the filling pieces without impediment.

With regard to the operation of such a mould and the way of manufacturing stones while using such a mould, reference is made to the contents of which are hereby incorporated herein by whose contents are considered to be part of the present application by reference.

In itself this known device is satisfactory, but in some cases putting the filling pieces in their correct position under the mould may present difficulties. From the U.S. Pat. No. 3,679,340 there is furthermore known a similar construction provided with filling pieces, which are each connected, by means of gussets, with one end to a rigidly constructed supporting construction in order to oppose deviations in the position of the filling pieces aimed at as well as possible. Not only does this lead to a comparatively heavy construction, but also there is a great risk of crack formation in such a rigid construction caused by vibrations generated for compressing the material in the mould.

OBJECT OF THE INENTION

The purpose of the invention is to obtain an improved guiding of the filling pieces, such that it can be ensured in an effective manner that, in particular in the first position, the filling pieces are arranged in the correct position relatively to the mould for forming the stones in the mould in the correct manner.

SUMARY OF THE INVENTION

According to the invention this can be achieved because extensions are connected to the filling pieces, these extensions being movable forward and backward with the filling pieces and co-operating with guide means for guiding the filling pieces, whereby the extensions project from the mould in the first position.

By means of such extensions a correct guiding of the filling pieces relatively to the mould can be ensured at all times, whilst in the second position of the filling pieces the extensions do not interfere with pressing the stones out of the mould.

BRIEF DESCRIPTION OF THE DRAWINGS

The invention will be further explained hereinafter with reference to a few possible embodiments of the construction according to the invention diagrammatically illustrated in the accompanying figures.

DETAILED DESCRIPTION OF THE PRESENTLY PREFERRED EMBODIMENTS

Figure 1:
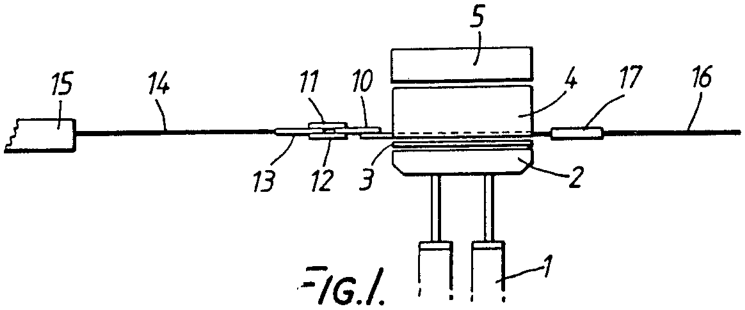
FIG. 1 is a diagrammatic view of a part of a device according to the invention.

As also described in the above-mentioned European patent application No. 0,214,684, the device also comprises a.o. a table 2 movable up-and-down by means of setting cylinders 1. Plates 3 can be successively supplied, by means of means not shown, to the table 2, on which plates the products to be formed, more in particular stones, can be formed using a mould 4 arranged above the table 2. The moulding mass for the stones can be compressed in the mould 4 by means of a stamp 5 arranged above the mould 4 and being movable in vertical direction, whereby the mould 4 and/or the stamp 5 can be set into vibration.

The mould 4 is subdivided into moulding rooms 8 by means of boundary wall 6 and 7 extending in longitudinal and transverse direction, the shape of those moulding rooms corresponding with the shape of the stones to be manufactured. Under the boundary walls 6 extending in one direction there are provided filling pieces 9 extending under the boundary walls 6, seen in FIG. 2, which filling pieces have a truncated conical cross-section, as appears from FIG. 2, and project with their triangular ends from both sides of the boundary walls 6.

The various filling pieces 9 extending parallel to each other are connected with one end to a strip-shaped connecting plate 10, which is attached, by means of a pair of connecting plates 11 and 12 made of a resilient material (e.g. rubber) to a strip-shaped connecting plate 13 corresponding with the strip-shaped connecting plate 10. The strip-shape connecting plate 13 is fitted to the end of a piston rod 14, which is fitted to a piston located in a setting cylinder 15.

It will be apparent that, instead of the connecting plates 11 and 12, other pivoting and/or flexible connecting means may be provided. Also it will be possible that several setting cylinders 15 are provided.

Figure 2:
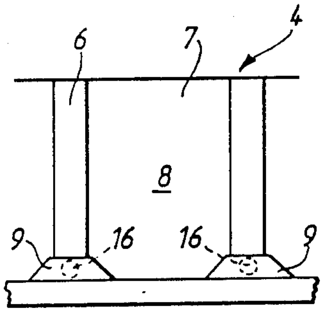
FIG. 2 illustrates on a larger scale the arrangement of a pair of guide walls with filling pieces arranged thereunder.

With the embodiment illustrated in FIGS. 1 and 2, each filling piece 9 is provided, at its end facing away from the strip-shaped connecting plate 10, with an extension 16 located in the extension of the filling piece 9, which in this embodiment is formed by a round rod.

Of course it will also be possible to use rods having an unround section. e.g., oval or quadrangular rods.

At the side of the setting cylinder 15 facing away from the mould 4, each extension 16 is guided in a guide bush 17 fixed to the frame (not shown) of the moulding device.

As appears in particular from FIG. 2, the extension 16 thereby has such a section that it is not wider than the thickness of a partition wall 6, at least measured in the horizontal direction.

As is also described in the above-mentioned European patent application 0214684, the filling pieces 9 extend under the partition walls 6 along the entire length of the partition walls 6 during filling of the mould 4 with the mass from which the stones are to be manufactured and during compression of the mass by means of the stamp 5, as a result of which recesses in the shape of bevelled edges are formed at the bottom ends of the stones by means of the parts of the filling pieces 9 projecting from the partition walls 6, seen in top view. After forming the stones, the filling pieces 9 are moved to the left, seen in FIG. 1, by means of the setting cylinder 15, such that the filling pieces 9 are completely retracted from their position under the partition walls 6 in order to enable pressing the stones formed in an upright position and resting on the plate 3 downward out of the mould 4 while the table 2 and the stamp 5 are moved downwards.

During the retraction to the left, seen in FIG. 1, of the filling pieces 9, the extensions 16 connected to the filling pieces 9 are taken along, whereby the extensions 16 are moved in the guide bushes 17 guiding the extensions 16. The construction is thereby such that, in the completely retracted left-hand position of the filling pieces 9, the ends of the extensions 16 remain inside the guide bushes 17. Because of this it is ensured that, when subsequently the filling pieces 9 are moved back to the right, the filling pieces 9 are guided under the partition walls 6 in the correct manner again. Accordingly, when the stones are being formed, the filling pieces 9 always assume their correct position relatively to a boundary wall 6.

As will be apparent from FIG. 2, the extensions 16 are located under the partition walls 6 in the position where the filling pieces 9 are completely retracted to the left, seen in FIG. 1, and thereby do not project from the partition walls 6, seen in top view, so that the extensions 16 do not interfere with pressing the stones downwards out of the mould 4.

It is noted that of course it will also be possible to connect the setting cylinder 15 to the ends of the extension 16 facing away from the filling pieces 9, instead of connecting it to the ends of the filling pieces 9 facing away from the extensions 16, so that then the filling pieces 9 will be pushed away from and pulled under the mould 4 respectively by means of the setting cylinder 15, via the extensions 16.

Figure 3:
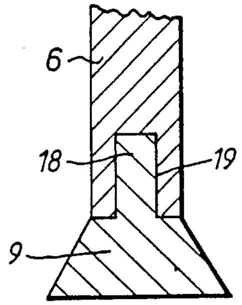
FIG. 3 is a section of the lower part of a further embodiment of a guide wall with a filling piece co-operating therewith.

In the embodiment illustrated in FIG. 3, the filling piece 9 is provided with an upright rib 18. The upright rib 18 has a rectangular section in this embodiment and is accommodated in a correspondingly shaped groove 19 provided in the bottom edge of the boundary wall 6. The upright rib 18 has an extension projecting past an outer end of the filling piece 9, which extension serves as a guide means for the relevant filling piece 9, in a similar manner as the extension 16. The extension of the upright rib 18 projecting from the filling piece 9 may also be guided, in a similar manner as the extension 16, by means of the guide bush 17, in a bush fixed to the frame. It will also be conceivable, however, that the extension projecting from the filling piece 9 already provides sufficient guiding in the groove 19 of the boundary wall 6 so that it may be decided not to provide such an additional guiding corresponding with the guide bush 17.

Figure 4:
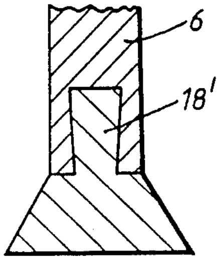
FIG. 4 is a section of the lower part of a further embodiment of a guide wall with a filling piece co-operating therewith.

In order to obtain a better support of the upright rib 18, it may, e.g., be constructed dovetailed, as is indicated for the guide rib 18' in FIG. 4. Because of this it is prevented that the guide rib 18' has a tendency to give way downwards.

Of course many variations to these embodiments of filling pieces and extensions will be possible.

Figure 5:
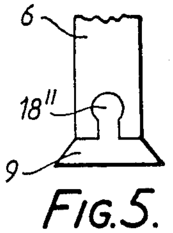
FIGS. 5-8 illustrate further possible embodiments of filling pieces.

In the embodiment according to FIG. 5, the rib 18'', also forming an extension, is guided in a boundary wall 6 and is connected to the filling piece 9. If has a more or less keyhole-shaped section.

Figure 6:
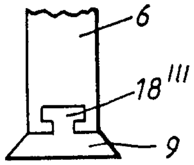

In the embodiment according to FIG. 6, the ridge 18''', has a T-shaped section.

Figure 7:
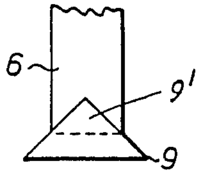

In the embodiment according to FIG. 7, the filling piece 9 with a rib part 9' located thereabove has a triangular section. The upper part 9' forming the rib, which is guided in a correspondingly shaped recess in the bottom edge of the boundary wall 6, projects from the filling piece 9.

Figure 8:
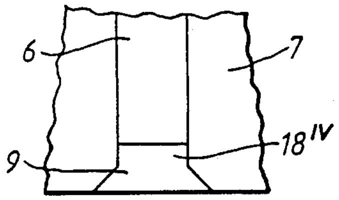

In the embodiment according to FIG. 8, a rib $18^{iv}$, connected to the filling piece and having a rectangular section, bears with its upper side against the bottom edge of the boundary wall 6 and is guided through the bottom edge and boundary planes of the boundary walls 7, which are being perpendicular to the boundary wall 6. The boundary planes are shaped to correspond with the section of the filling piece 9 and the rib $18^{iv}$.

Figure 9:
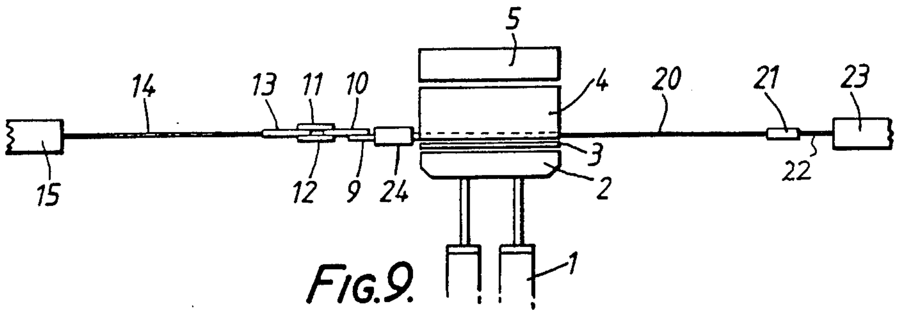
FIG. 9 diagrammatically illustrates a further embodiment of a device according to the invention.

The embodiment of the device according to the invention illustrated in FIG. 9 largely corresponds with the embodiment illustrated in FIG. 1, and corresponding parts are therefore provided with the same reference numbers in both figures. In this embodiment there are provided extension pieces 20, which are each connected with one end to a filling piece 9 and with their other end to a joint strip-shaped connecting plate 21. The strip-shaped connecting plate 21 is fitted to the end of a piston rod 22, which is connected to a piston arranged in a setting cylinder 23. The connecting pieces may, e.g., be formed by rods, but also by flexible cables or the like. In this embodiment use may be made of single-action setting cylinders, whereby the setting cylinder 15, in the manner described above, will retract the filling pieces 9 from under the mould 4 for removing the stones from the mould 4, whereby the extension pieces 20 will be located under the boundary walls 6, as will be apparent from the above. Of course the extension pieces 20 are again constructed so that they do not project from the boundary walls, seen in top view.

After the stones have been removed from the mould 4 the filling pieces 9 may be pulled under the boundary walls 6 again by means of a single-action setting cylinder 15.

Given a correct synchronisation, it will also be possible to use double-action setting cylinders 15 and 23.

Of course it will again be possible here, if considered necessary, to use several setting cylinders 15 and/or 23.

As is further illustrated in FIG. 9, further guide means 24 for the filling pieces 9 may be arranged near the mould 4, in which guide means the filling pieces 9 are displaceable in their longitudinal direction.

It will be apparent that many more additions and/or alternations to the possible embodiments of the construction according to the invention described above will be possible.

Figure 10:
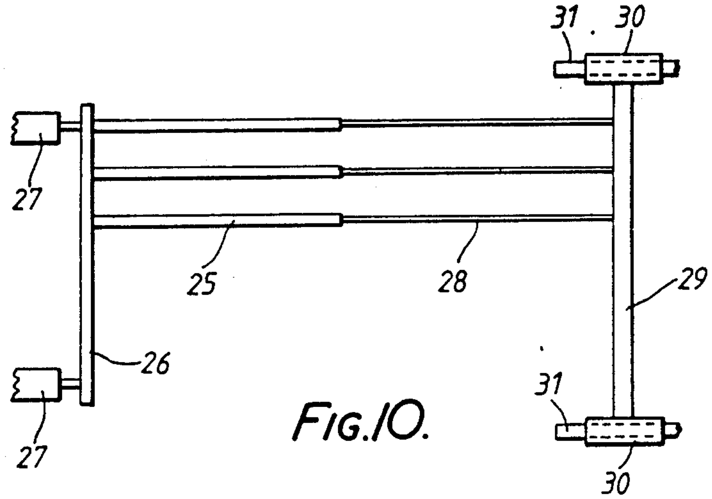
FIG. 10 diagrammatically illustrates a possible arrangement of filling pieces with extensions.

Thus FIG. 10 illustrates an embodiment wherein rod-shaped filling pieces 25 are fixed with one end to a carrier 26 extending perpendicularly to the longitudinal direction of the filling pieces 25. The carrier 26 is movable forward and backward in the longitudinal direction of the filling pieces 25 by means of setting cylinders 27, in a manner similar to the one described above. The connection between the filling pieces 25 and the carrier 26 and/or the connection between the carrier 26 and the setting cylinders 27 will preferably be flexible and/or pivotable, as described with reference to the preceding embodiments.

The filling pieces 25 are provided with extensions 28, which are connected with their ends facing away from the filling pieces 25 to a carrier 29 extending transversely to the longitudinal direction of the extensions 28. Bushes 30 are fitted to the ends of the carrier 29. The bushes 30 serve as guides and are slidable on rods or shafts 31 extending parallel to the longitudinal direction of the filling pieces 25.

In the above embodiments, the guide means comprise bush-shaped means in which the filling pieces and/or extensions are slidable in their longitudinal direction. It will be apparent, however, that it will also be possible to guide the extensions and/or the filling pieces with guide wheels contacting the outer circumference of the extensions and/or the filling pieces.

Figure 11:
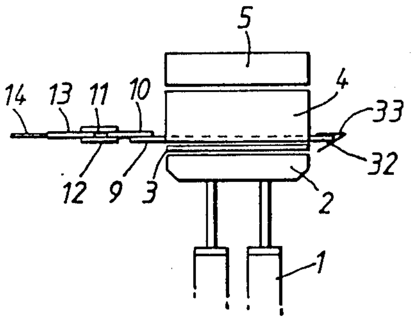
FIG. 11 diagrammatically illustrates a further possibility of an embodiment of a device according to the invention.
Figure 12:
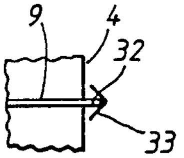
FIG. 12 diagrammatically illustrates a top view of a part of FIG. 11.

The embodiment of the construction according to the invention illustrated in FIGS. 11 and 12 largely corresponds with the device illustrated in FIG. 1, and corresponding parts are therefore provided with the same reference numbers in the various figures. In this embodiment each filling piece 9 is provided with an extension 32. The extension 32 projects from the mould 4 (in the position illustrated in FIG. 11 in which the filling pieces are located under the mould 4) and co-operates thereby with a guide means 33. As will be apparent from the FIGS. 11 and 12, the guide means 33 is provided with a cavity for accommodating the extension 32. The section of the cavity gradually becomes smaller in the direction in which the extension 32 is inserted into the relevant cavity when moving the filling piece 9 under the mould 4 (moving to the right, seen in FIGS. 11 and 12).

Figure 13:
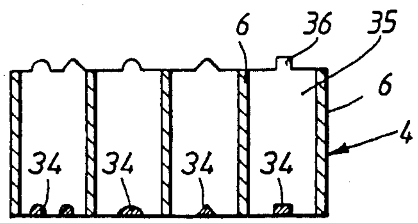
FIG. 13 diagrammatically illustrates a mould with various possible embodiments of filling pieces in section.

The embodiment of FIGS. 11 and 12 is particularly suitable for use with a mould 4 wherein filling pieces 34 extend parallel to and, seen in top view, between boundary walls 6 of the mould 4 (FIG. 13). Such moulds are, e.g., used for manufacturing stones 35 which are provided with a recess at one end, the shape of the recess corresponding with the shape of a filling piece 34, whilst at the other end there is located a projection 36 having a correspondingly shaped section. As will be apparent from fig 13, such a filling piece may have an arbitrary section, whilst it will also be possible that more than one filling piece extends between a pair of boundary walls 6, as indicated in the left-hand part of FIG. 13.

Figure 14:
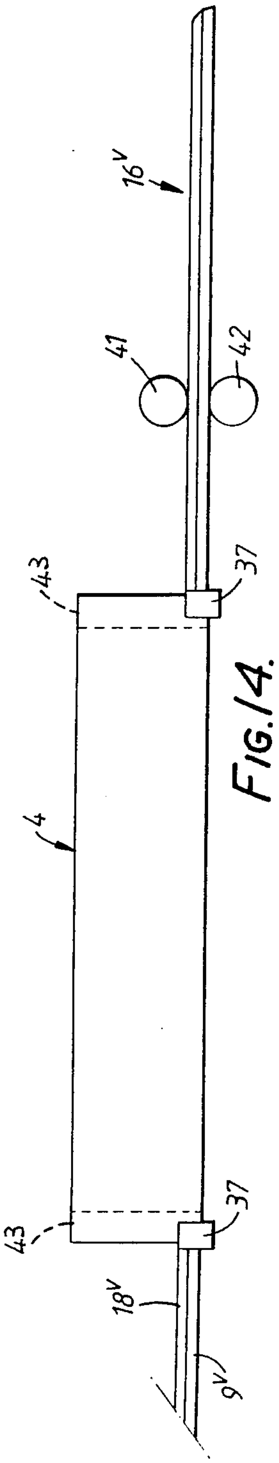
FIG. 14 diagrammatically illustrates a side view of a further embodiment of a mould with filling pieces.
Figure 19:
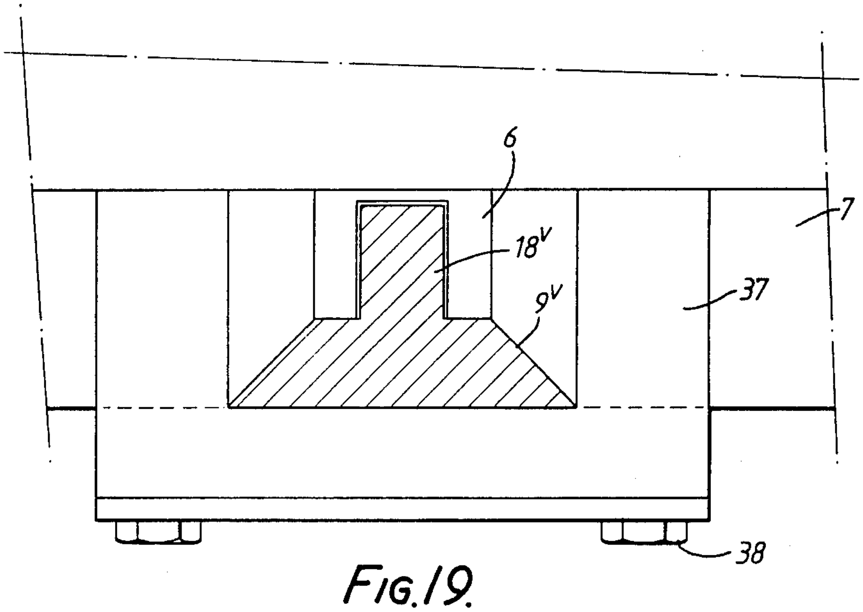
FIG. 19 is a larger-scale view of FIG. 14, seen according to the arrow XIX—XIX in FIG. 14.

In the embodiment according to FIGS. 14--19, U-shaped sliding blocks 37 are fixed to the mould 4 on opposed end walls 43 by means of bolts 38 for guiding filling pieces $9^v$. The filling pieces $9^v$ are provided, in a similar manner as in the embodiment according to FIG. 3, with upright ribs $18^v$ forming one unit therewith, and the ribs $18^v$ are slidable in corresponding grooves provided in the boundary walls 6, as will be apparent in particular from FIG. 19.

Figure 15:
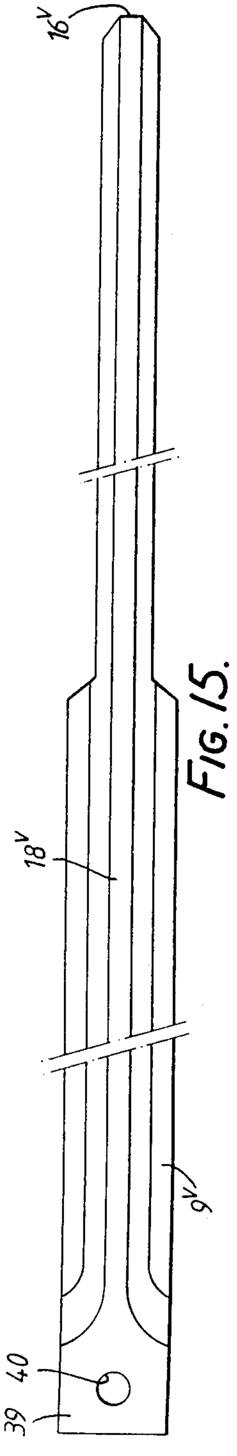
FIG. 15 is a top view of a filling piece used in the mould according to FIG. 14.
Figure 16:
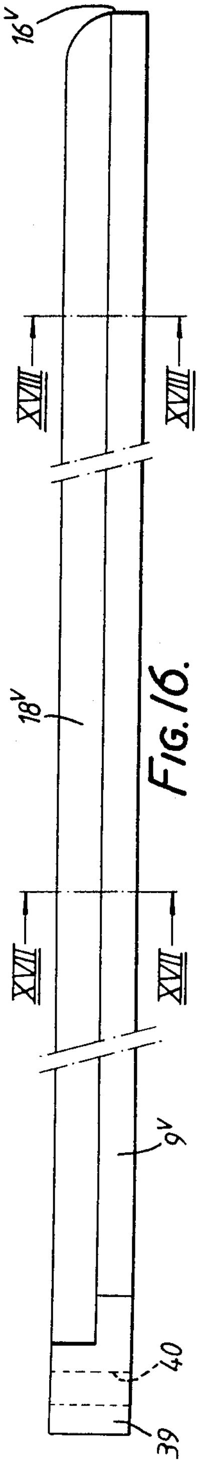
FIG. 16 is a side view of FIG. 14.
Figure 17:
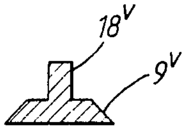
FIG. 17 is a section of FIG. 16, seen according to the line XVIII—XVIII.

The filling pieces $9^v$ and the guide ribs $18^v$ are at one end connected to a connecting piece 30 forming one unit therewith (FIGS. 15, 16). The said connecting piece 39 is provided with a bore 40 for accommodating a pin by means of which the filling piece $9^v$ may be connected to a setting cylinder for moving the filling piece $9^v$ in its longitudinal direction relatively to the mould 4 in the manner described above.

Figure 18:
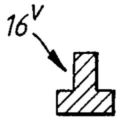

In this embodiment, the filling piece $9^v$ is provided with an extension $16^v$ forming one unit therewith. The extension $16^v$ has a T-shaped section, as appears in particular from FIG. 18, and is shaped such that the vertical leg of the extension piece $16^v$ has the same dimensions in cross section as the guide rib $18^v$, whilst the height of the horizontal leg is equal to the height of the filling piece $9^v$ and the width of the horizontal leg is equal to or slightly smaller than the width of a boundary wall 6.

Because of this embodiment of the extension 16, a particularly solid construction of this extension is obtained, whilst also when the filling piece $9^v$ is retracted from under the mould 4 the rooms located directly under the boundary walls 6 remains filled by the horizontally extending legs of the extensions $16^v$ having a T-shaped section.

FIG. 14 illustrates the filling piece $9^v$ with the extension $16^v$ forming one unit therewith in the position in which the filling pieces are located under the partition walls in a position suitable for forming stones provided with bevelled edges. As will be apparent from FIG. 14, the extension $16^v$ projecting from the mould 4 is thereby caught between a pair of freely rotatable rolls 41 and 42 fixed to the frame of the mould 4. The rolls 41, 42 are located above and under the extension $16^v$ respectively. Furthermore, the construction is made such that, when the filling pieces $9^v$ are retracted from under the boundary walls 6, the right-hand end, seen in FIG. 14, of the extension $16^v$ will still be supported by the sliding block 37 located most to the right in FIG. 14.

Many variations to and combinations of the above embodiments will be possible within the spirit and scope of the invention.

The above-mentioned European patent application 0214684 e.g. substantially relates to a device wherein the mould 4, except for the fact that it can be set into vibration, has a fixed arrangement relatively to the frame. It will be apparent, however, that the construction according to the present invention can also be used with a device wherein the mould is movable up-and-down relatively to the frame of the device, whereby the construction will have been made such that the filling pieces, the extensions of the filling pieces, and the guides can also move up-and-down along with the up-and-down movable mould.

We claim:

1. A device for manufacturing stones, said device comprising:
(a) a frame;
(b) a mould mounted on said frame and having boundary walls that define moulding rooms inside said mould;
(c) a stamp mounted on said frame and movable up-and-down arranged above said mould;
(d) a table arranged under said mould in position to receive stones ejected from said mould by said stamp;
(e) a plurality of filling pieces which are movable in a direction of movement between:
(i) a first position, in which said plurality of filling pieces are located under said mould and wherein, seen in top view, at least parts of said plurality of filling pieces project from said boundary walls for forming recesses, and
(ii) a second position, in which said plurality of filling pieces are located beside said mould, seen in top view; and (f) extensions connected to said plurality of filling pieces, said extensions:
(i) being movable forward and backward;
(ii) co-operating with guide means for guiding said plurality of filling pieces; and
(iii) projecting from said mould when said plurality of filling pieces are in their first position.

2. A device according to claim 1, wherein:
(a) said extensions are guided in said guide means when said plurality of filler pieces are in their second position and
(b) said guide means are fixed to said frame.

3. A device according to claims 1 or 2, wherein said extensions have such a length that said extensions are guided through said guide means over their entire stroke between their first and their second position.

4. A device according to claim 1, wherein, in the second position of said plurality of filling pieces, more than half of the lengths of said extensions are located under the outer wall of said mould.

5. a device according to claim 1, wherein ribs fixed to said plurality of filling pieces are guided in grooves provided at the bottom sides of said boundary walls.

6. A device according to claim 5, wherein, seen in cross-section, part of a rib guided in a recess of a boundary wall is constructed wider than a part of the rib located therebelow.

7. A device according to claim 1, wherein:
(a) a guide means for the end remote from the corresponding one of said plurality of filling pieces of at least one of said extensions is arranged beside said mould;
(b) said guide means is provided with a recess for accommodating the end; and
(c) the size of the section of said recess gradually diminishes from a first dimension remote from said mould to a second, smaller dimension adjacent to said mould.

8. A device according to claim 1, wherein:
(a) setting cylinders are arranged on opposite sides of said mould;
(b) the ends of said plurality of filling pieces facing away from said extensions are connected to said setting cylinder(s) arranged on one of said opposite sides of said mould; and
(c) the ends of said extensions facing away from said plurality of filling pieces are connected to said setting cylinder(s) arranged on the other one of said opposite sides of said mould.

9. A device according to claim 1, wherein:
(a) said plurality of filling pieces and said extensions are at one end connected to a carrier extending transversely to the direction of movement of said plurality of filling pieces and
(b) said carrier is provided with guides at its ends.

10. A device according to claim 1, wherein on opposite sides of said mould there are provided guides for said plurality of filling pieces and said extensions.

11. A device according to claim 1, wherein at least one of said extensions has a T-shaped section.

12. A device according to claim 11, wherein:
(a) the dimensions of a section of a vertical leg of said at least one of said extensions are at least approximately equal to the corresponding dimensions of a section of a rib fixed to the corresponding one of said plurality of filling pieces and
(b) said at least one of said extensions is located in the extension of the corresponding leg.

13. A device according to claims 11 or 12, wherein:
(a) the width of the horizontal leg of said at least one of said extensions is at least substantially equal to the thickness of a corresponding partition wall of said mould and
(b) the height of the horizontal leg of said at least one of said extensions is at least substantially equal to the height of one of said plurality of filling pieces.

14. A device according to claim 1, wherein slide blocks carrying said plurality of filling pieces and said extensions respectively are fixed to two end walls extending perpendicularly to the longitudinal direction of one of said plurality of filling pieces.

15. A device according to claim 1, wherein:
(a) said plurality of filling pieces are at one end connected to a carrier extending transversely to the direction of movement of said plurality of filling pieces and
(b) said carrier is provided with guides at its ends.

16. A device according to claim 1, wherein:
(a) said extensions are at one end connected to a carrier extending transversely to the direction of movement of said plurality of filling pieces and
(b) said carrier is provided with guides at its ends.

* * * * *